United States Patent [19]
Cheng

[11] Patent Number: 6,129,373
[45] Date of Patent: Oct. 10, 2000

[54] SINGLE-HANDED FOLDING DEVICE

[76] Inventor: Kenny Cheng, No. 16, Lane 47, Chih Feng St., Taipei, Taiwan

[21] Appl. No.: 09/500,865

[22] Filed: Feb. 9, 2000

[51] Int. Cl.[7] ........................................................ B62B 3/02
[52] U.S. Cl. ............................ 280/647; 280/658; 280/650
[58] Field of Search ................................... 280/642, 654, 280/647, 655, 650, 657, 658, 47.27, 47.28, 47.29, 655.1

[56] References Cited

U.S. PATENT DOCUMENTS

| | | | |
|---|---|---|---|
| 4,191,397 | 3/1980 | Kassai | 280/647 |
| 4,388,790 | 6/1983 | Kassai | 280/647 |
| 5,308,163 | 5/1994 | Chin-Shung | 280/47.29 |
| 5,490,685 | 2/1996 | Kitagama et al. | 280/642 |
| 5,535,483 | 7/1996 | Cabaguero | 280/642 |
| 5,951,037 | 9/1999 | Hsieh et al. | 280/47.29 |
| 6,036,221 | 3/2000 | Yang | 280/642 |
| 6,068,784 | 5/2000 | Kakuda | 280/642 |

*Primary Examiner*—Richard M. Camby
*Attorney, Agent, or Firm*—Harness, Dickey & Pierce, P.L.C.

[57] ABSTRACT

A single-handed folding device comprises a slidable pressing means having flanges, a rivet for slidably holding the slidable pressing means, slidable keys for performing locking operation, and wires with one end fixed to the slidable pressing means and the other end fixed to the slidable keys. While the slidable pressing means is moved with relation to the rivet, the wires will be tensioned, which in turn cause the slidable keys to be pulled to an opening position so as to loosen the locking means. Further, a spring is arranged at the center of the slidable pressing means so that a force should be exerted during pressing the slidable pressing means. In addition, the single-handed folding device further includes sliding rings to facilitate the movement of the wires.

3 Claims, 2 Drawing Sheets

SINGLE-HANDED FOLDING DEVICE

BACKGROUND OF THE INVENTION

This invention relates to a single-handed folding device. More particularly, it relates to a single-handed folding device of a foldable frame which can be easily folded with one hand.

DESCRIPTION OF THE RELATED ART

For the sake of minimizing the physical volume of baby carriage to facilitate its carrying, e.g. putting into the trunk of a car, such foldable carriages have been available in the related products for years. These foldable carriages are often designed to have a locking means so that a firm structure can be sustained after being unfolded for use. One design of the locking means is a trigger-type slidable means which is arranged to be adjacent to the joint portions of the handle frame. When the user wants to fold such kind of foldable carriages, he or she should lower the body so as to have two hands simultaneously approach to the trigger-type slidable means, and then press the triggers to release the locking status. Accordingly, this kind of foldable carriage is somewhat inconvenient in use. In an improved design, a single-handed folding device with a locking button is arranged at the top portion of the handle frame of the carriage to cooperate with the locking means. To fold this kind of carriage, the user may use one of his or her thumb to push the locking button and twist the folding device to draw two internal wires at both sides so that the two internal wires would pull the slidable locking means arranged near the joint portions to a released position. With this single-handed folding device, one may use single hand to release the locking status of the locking means. However, there are still drawbacks existing in this kind of single-handed folding device. For example, if the locking button is arranged at the left side of the single-handed folding device, it is only suitable to operate this means by right hand, while if the locking button is arranged at the right side, only left hand is available. In addition, the twisting motion is arduous for people whose wrists are not so agile.

SUMMARY OF INVENTION

Based on the above aspect, the purpose of this invention is to provide a single-handed folding device, which can be easily operated with single hand (either left hand or right hand) and meets the requirements of ergonomics in operation.

To achieve the above purpose, this invention provides a single-handed folding device comprising a slidable pressing means having flanges, a rivet for slidably holding the slidable pressing means, slidable keys for performing locking operation, and wires with one end fixed to the slidable pressing means and the other end fixed to the slidable keys. While the slidable pressing means is moved with relation to the rivet, the wires will be tensioned, which in turn cause the slidable keys to be pulled to an opening position so as to loosen the locking means. Further, a spring is arranged at the center of the slidable pressing means so that a force should be exerted during pressing the slidable pressing means. Besides, the outer edge of the slidable pressing means is configured with waves so that the user can grasp the slidable pressing means with comfort as conducting the folding operation or pushing the carriage. In addition, the single-handed folding device further includes sliding rings to facilitate the movement of the wires.

BRIEF DESCRIPTION OF THE DRAWINGS

These and other objects, features and advantages of the present invention will become more apparent from the following description when taken in conjunction with the accompanying drawings.

Figure 1:
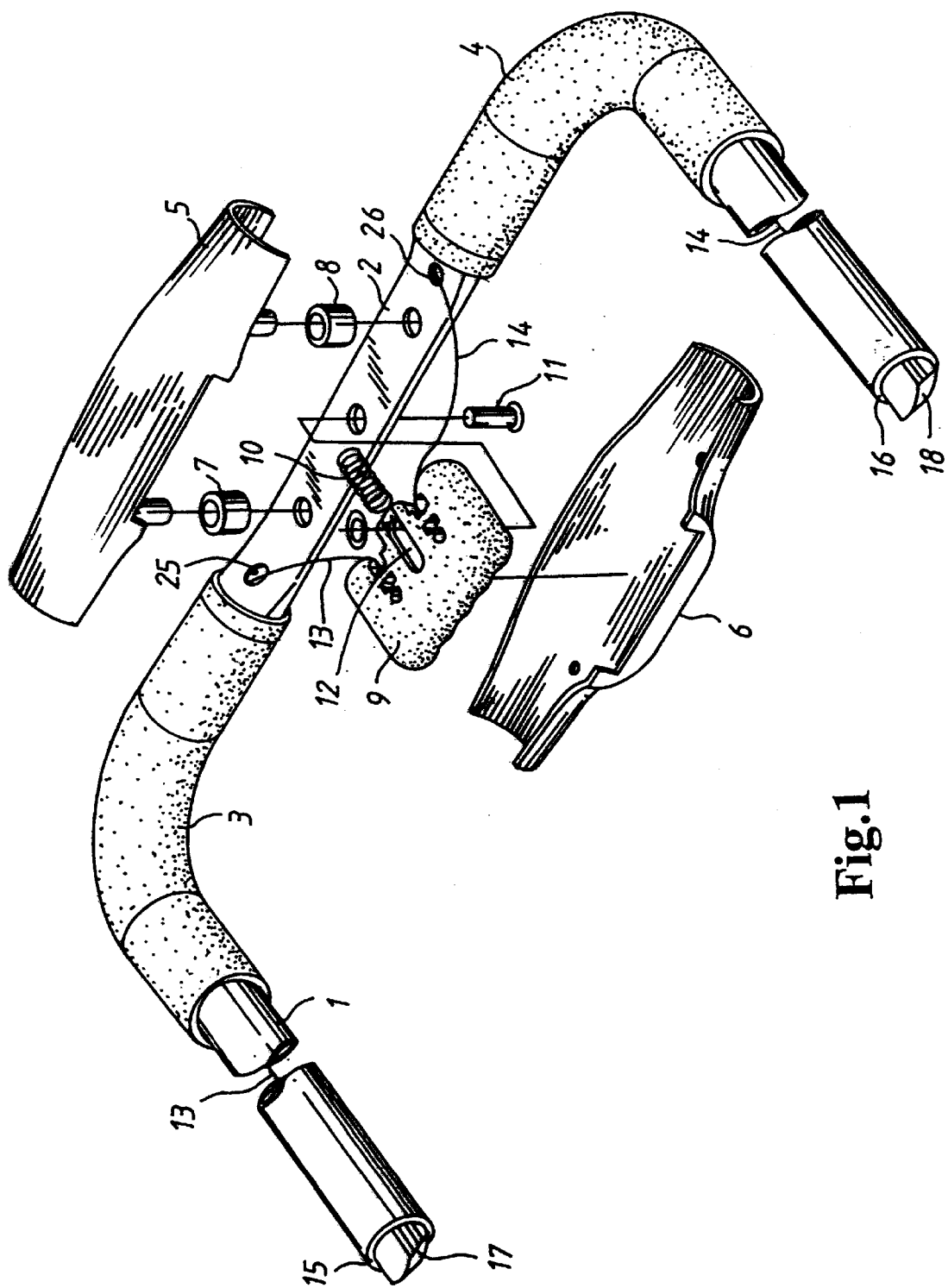
FIG. 1 shows a perspective, exploded view of the single-handed folding device, according to the present invention.

List of elements in the drawings
1 handle frame
2 rectangular plate
3, 4 pad
5 upper handle casing
6 lower handle casing
7, 8 sliding rings
9 slidable pressing means
10 spring
11 rivet
12 sliding channel
13, 14 wires
15, 16 openings
17, 18 slidable keys
19, 20 blocking pieces
21, 22 notches
23, 24 flanges
25, 26 through holes

DETAILED DESCRIPTION OF THE PREFERRED EMBODIMENT

FIG. 1 shows a perspective, exploded view of the single-handed folding device, according to the present invention. The reference numeral 1 indicates the handle frame of the baby carriage. When a user wants to unfold the baby carriage from its folded status, the handle frame 1 is swung up to a lifted position so that the user may pull the carriage by the handle frame 1. A pair of soft pads 3 and 4 are arranged on both sides of the handle frame 1. The central portion of the handle frame 1 is formed as a rectangular plate 2, which is enclosed by an upper handle casing 5 and a lower handle casing 6 with screws(not shown). Two symmetrically arranged sliding rings 7 and 8, which are also fastened by the above mentioned screws, are provided on the rectangular plate 2. A slidable pressing means 9 is provided within the space between the upper handle casing 5 and the lower handle casing 6. Both sides of this slidable pressing means 9 are attached to wires 13 and 14 respectively, while the other ends of these wires 13 and 14 are respectively connected to the slidable keys 17 and 18 through the hollowed handle frame 1.

Figure 2:
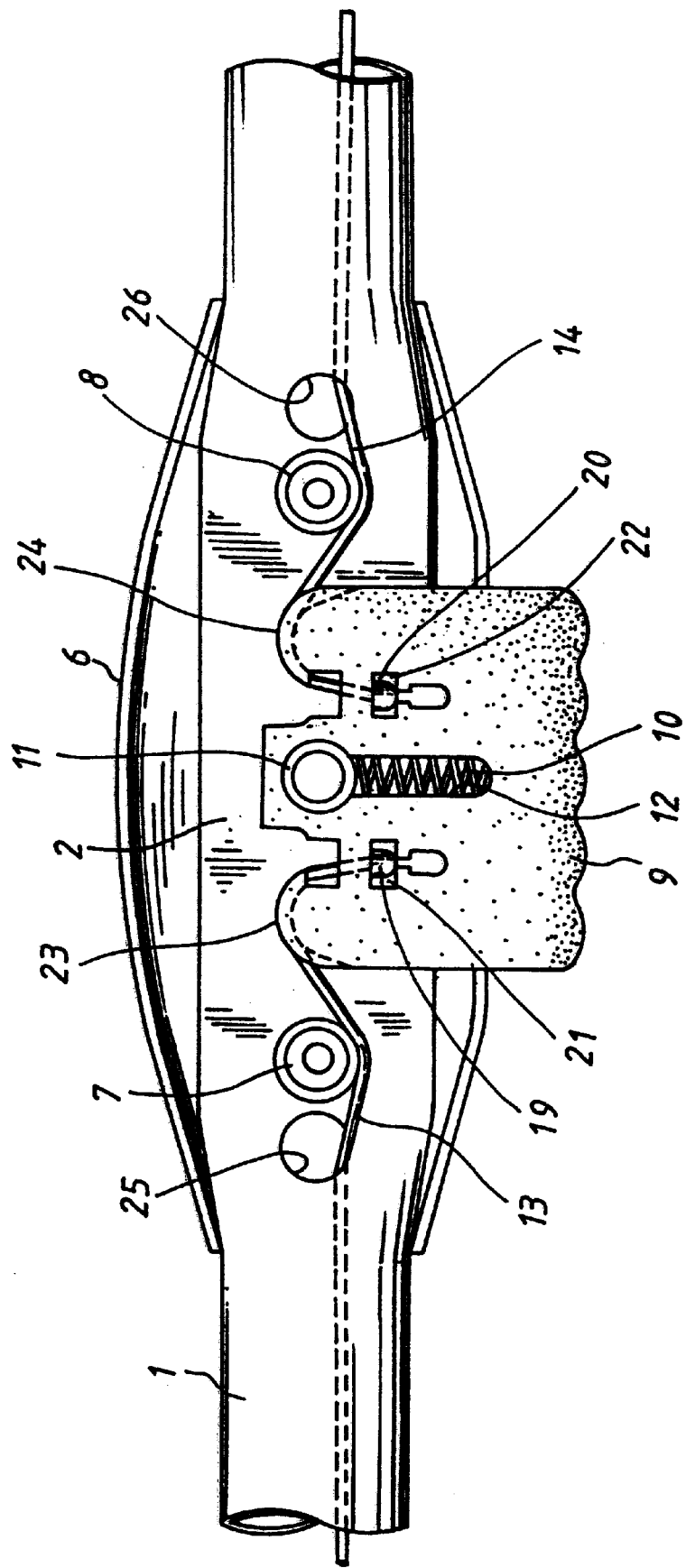
FIG. 2 shows a partially enlarged view of the single-handed folding device from the top, according to the present invention.

Now refer to FIG. 2, which shows a partially enlarged view of the single-handed folding device from the top, according to the present invention. In the embodiment of FIG. 2, the slidable pressing means 9 is secured (slidably) upon the rectangular plate 2 by a rivet 11. This rivet 11 is also utilized to resist the spring 10 which is provided within the sliding channel 12 of the slidable pressing means 9. Besides, the wires 13 and 14 are fastened in the notches 21 and 22 of the slidable pressing means 9 by the blocking pieces 19 and 20. Then, the wires 13 and 14 are slidably lodged in the flanges 23 and 24 of the slidable pressing means 9. After crossing the sliding rings 7 and 8, the wires 13 and 14 are entered into the handle frame 1 by way of the through holes 25 and 26, respectively.

Next, the operational procedure of the single-handled folding device according to the present embodiment is described by reference to FIG. 1 and FIG. 2. While the carriage is in use, the spring 10 within the slidable pressing means 9 is under an expanded status, so that the slidable keys 17 and 18 respectively connected to one end of the wires 13 and 14 protrude from the opening 15 and 16. Thus the protruding slidable keys 17 and 18 are able to engage with the locking means of the carriage. When the user desires to release the locking means to fold the carriage, he/she simply has to press the slidable pressing means 9 inward with one hand. The outer edge of the slidable pressing means 9 is configured with waves so that the user can grasp the slidable pressing means 9 with comfort as conducting the folding operation or pushing the carriage. When the slidable pressing means 9 is pressed in, it will be moved upon the rectangular plate 2 (with the rivet 11 as a fixed point), so that the wires 13 and 14 that are respectively lodged in the flanges 23 and 24 and pressed upon the sliding rings 7 and 8 will be pulled. Accordingly, the slidable keys 17 and 18 which are connected to the other end of wires 13 and 14 are caused to draw back into the opening 15 and 16, thereby the locking means of the carriage is released. The unlocking of the locking means and the folding of the handle frame 1 can thus be easily accomplished. Meanwhile, since the slidable pressing means 9 is still being pressed in, the spring 10 is under a compressed status by the resistance of the rivet 11. If the pressure exerted upon the slidable pressing means 9 is removed, then the slidable keys 17 and 18 will protrude from the opening 15 and 16 again, due to the restoring force of the spring 10.

While the present invention has been described with reference to a preferred embodiment, it will be understood by those skilled in the art that various changes may be made and equivalents may be substituted for elements thereof without departing from the scope of the invention. Therefore, it is intended that the invention will include all embodiments falling within the scope of the appended claims.

What is claimed is:

1. A single-handed folding device, comprising a slidable pressing means having flanges, a rivet for slidably holding the slidable pressing means, slidable keys for performing locking operation, and wires with one end fixed to the slidable pressing means and the other end fixed to the slidable keys;

when the slidable pressing means is moved with relation to the rivet, the wires will be tensioned, which in turn cause the slidable keys to be pulled to an opening position so as to loosen the locking means.

2. The single-handed folding device according to claim 1, wherein a spring is arranged at the center of the slidable pressing means so that a force should be exerted during pressing the slidable pressing means.

3. The single-handed folding device according to claim 1, further comprising sliding rings to facilitate the movement of the wires.

* * * * *